(12) United States Patent
Ferguson et al.

(10) Patent No.: US 8,146,999 B2
(45) Date of Patent: Apr. 3, 2012

(54) AIRCRAFT SEAT WITH ADJUSTABLE ARMREST

(75) Inventors: Keith Michael Ferguson, Colorado Springs, CO (US); Donald R. Pinkal, Colorado Springs, CO (US)

(73) Assignee: AMI Industries. Inc, Colorado Springs, CO (US)

( * ) Notice: Subject to any disclaimer, the term of this patent is extended or adjusted under 35 U.S.C. 154(b) by 331 days.

(21) Appl. No.: 12/552,525

(22) Filed: Sep. 2, 2009

(65) Prior Publication Data

US 2011/0049960 A1    Mar. 3, 2011

(51) Int. Cl.
*B60N 2/46* (2006.01)

(52) U.S. Cl. .......... 297/411.35; 297/411.36; 297/411.38

(58) Field of Classification Search ............. 297/411.35, 297/411.36, 411.38; 244/122 R, 188.6, 129.1; 292/66, 68, 210
See application file for complete search history.

(56) References Cited

U.S. PATENT DOCUMENTS

| | | | |
|---|---|---|---|
| 4,186,964 A | 2/1980 | Marrujo et al. | |
| 4,400,033 A | 8/1983 | Pietsch | |
| 4,763,860 A * | 8/1988 | Vauvelle et al. | 244/122 R |
| 5,210,888 A * | 5/1993 | Canfield | 5/113 |
| 5,727,845 A | 3/1998 | Jackson-Wynch | |
| 5,749,629 A * | 5/1998 | Heath et al. | 297/411.36 |
| 5,795,025 A | 8/1998 | Murphy | |
| 5,795,026 A | 8/1998 | Dral et al. | |
| 6,132,001 A | 10/2000 | Su | |
| 6,264,273 B1 | 7/2001 | Waters, Sr. | |
| 6,616,099 B2 | 9/2003 | Sankrithi | |
| 6,739,552 B2 | 5/2004 | Sankrithi et al. | |
| 6,793,181 B1 | 9/2004 | Hallock | |
| 7,093,336 B2 * | 8/2006 | Grossman et al. | 29/434 |
| 7,306,292 B2 * | 12/2007 | Muraoka et al. | 301/61 |
| 7,980,631 B2 | 7/2011 | Diffrient | |
| 2007/0205642 A1 | 9/2007 | Bejin et al. | |
| 2008/0252109 A1 | 10/2008 | Salzer et al. | |
| 2009/0241610 A1 * | 10/2009 | Watts et al. | 70/91 |

* cited by examiner

*Primary Examiner* — Laurie Cranmer
(74) *Attorney, Agent, or Firm* — Jerry J. Holden; John D. Titus

(57) ABSTRACT

An aircraft seat has an adjustable armrest in which the armrest platform is supported by a hinged attachment to an armrest support member. The hinged attachment between the armrest platform and the arm support member is located at the wrist-end of the arm support member near the aircraft control stick. The armrest platform and the armrest support are locked into position by means of telescoping struts that are controlled at the wrist-end of the arm platform member. The telescoping struts can be selectively locked to create triangular and/or quadrilateral trusses that lock the armrest firmly into position and may include springs or other elements to bias the armrest platform up and forward so that the armrest "floats" when the telescoping struts re released.

20 Claims, 3 Drawing Sheets

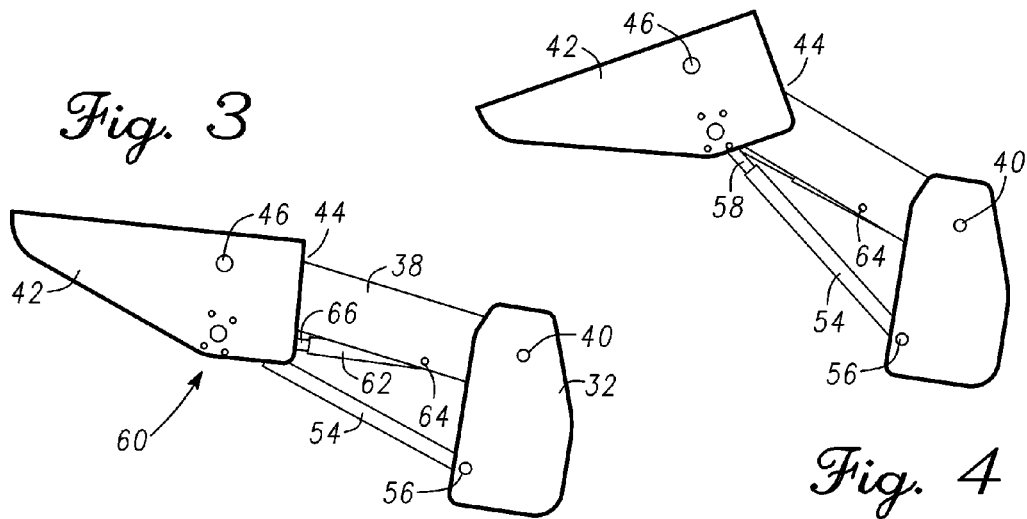
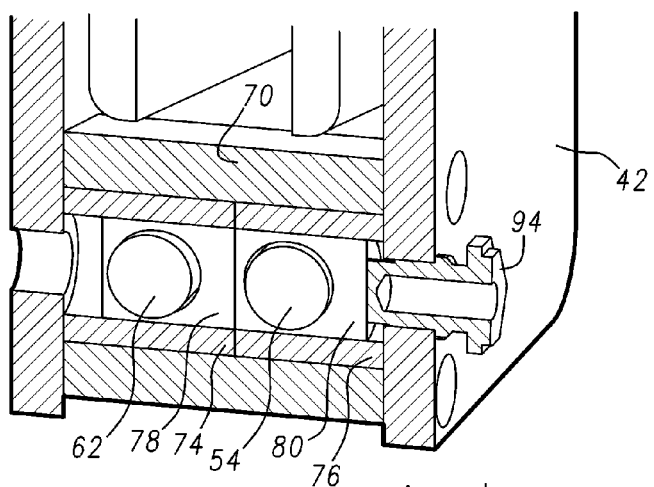
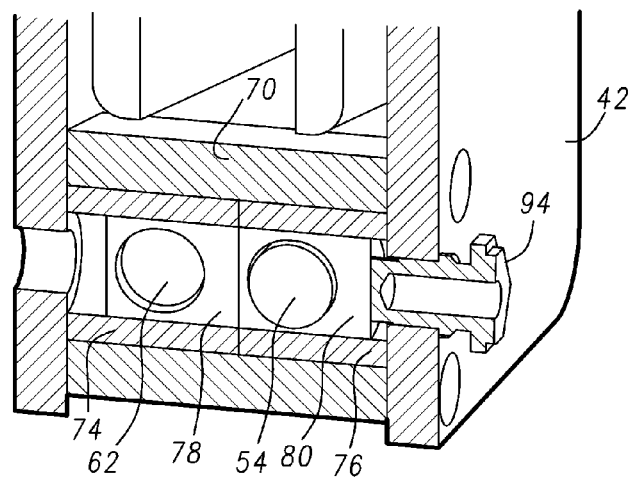

AIRCRAFT SEAT WITH ADJUSTABLE ARMREST

BACKGROUND OF THE INVENTION

Modern aircraft with side stick controllers typically require that the pilot seating include an armrest that is adjustable to accommodate multiple operators to position their arm to safely and comfortably operate the side stick controller. Once in this position, the armrest must then be securely locked in its new location. Prior art pilot seating has conventionally included an adjustable armrest that is pivoted near the occupant's elbow. The pivot is then movable vertically along the axis of the seat back. This type of armrest is cumbersome to use because must first be adjusted vertically to accommodate the occupant's elbow height, then the angle adjusted so that the occupant's hand is located at the appropriate position relative to the side stick controller. Additionally, because the locking mechanisms must be robust, in order to resist in-flight acceleration, landing and crash loads, prior art aircraft seating often have locks that permit only relatively coarse adjustment (e.g., ratchets) or are unnecessarily slow and cumbersome to use (e.g., screw or worm drives).

Because the ultimate purpose of the armrest is to position the pilot's hand appropriately relative to the fixed side stick controller, what is needed is a pilot seat having an adjustable armrest that is not constrained to tilt about a pivot fixed at the pilot's elbow, but which freely floats (e.g., can be tilted about an axis through the pilot's wrist or any other location) and can be smoothly and effortlessly locked into position.

SUMMARY OF THE INVENTION

The present invention comprises an aircraft seat with an adjustable armrest. According to an illustrative embodiment, the armrest platform is supported by a hinged attachment to an armrest support member. The armrest support member, rather than the armrest platform is hinged to the seat frame near the seat back. The hinged attachment between the armrest platform and the arm support member is located at the wrist-end of the arm support member near the aircraft control stick. This arrangement enables a user to raise and lower, then tilt the armrest from a position near the side stick controller rather than tilting from a pivot near the seat back. The armrest platform and the armrest support are locked into position by means of telescoping struts that are controlled at the wrist-end of the arm platform member. The telescoping struts can be selectively locked to create triangular and/or quadrilateral trusses that lock the armrest firmly into position and may include springs or other elements to bias the armrest platform up and forward so that the armrest "floats" when the telescoping struts re released.

BRIEF DESCRIPTION OF THE DRAWING

The present invention will be better understood from a reading of the following detailed description, taken in conjunction with the accompanying drawing figures in which like references designate like elements and, in which:

FIG. 3 is a schematic view of the adjustable armrest of FIG. 1 in its fully lowered and tilted back position;

FIG. 4 is a schematic view of the adjustable armrest of FIG. 1 in its fully raised and tilted forward position; and FIG. 5 is a cross-sectional view of a locking mechanism to lock the telescoping struts shown in its locked position;

FIG. 6 is a cross-sectional view of a locking mechanism to lock the telescoping struts shown in its unlocked position;

DETAILED DESCRIPTION

Figure 1:
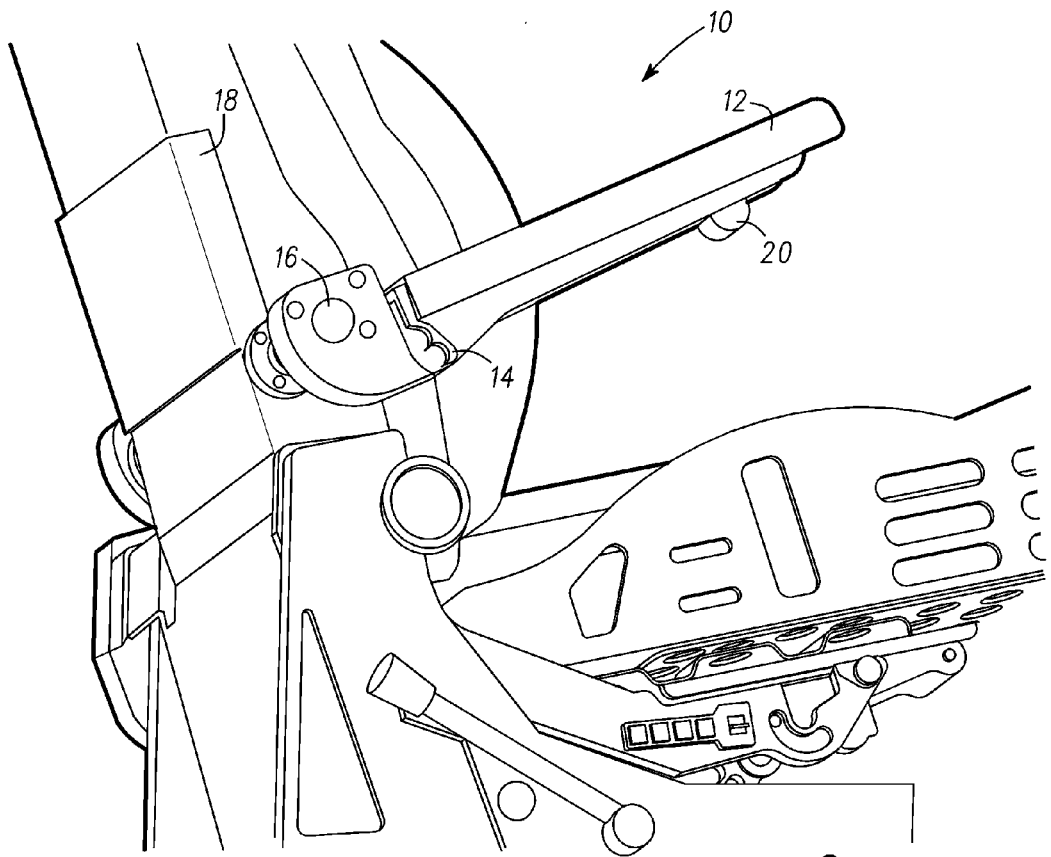
FIG. 1 is a rear perspective view of a prior art aircraft pilot seat.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

With reference to the figures and in particular, FIG. 1, conventional aircraft pilot seating such as prior art seat 10 are often equipped with adjustable armrests such as armrest 12. Typically adjustable armrest 12 is adjusted first by releasing lever 14 which enables the pivot 16 to be moved vertically relative to seat back 18 of seat 10. This adjustment positions the pivot 16 at a comfortable elevation relative to the pilot's elbow, but may not position armrest 12 so that the pilot's hand is in the proper location for a side stick controller. Accordingly, a second adjustment such as thumbwheel 20 must be provided to enable the tilt angle of armrest 12 to be adjusted. The tilt angle must be self-locking. Accordingly, thumbwheel 20 is often a screw drive mechanism that is slow and cumbersome to operate. Additionally, since pivot 16 is not located exactly at the pilot's elbow, adjustment of the armrest may be a sequential process in which the armrest is iteratively tilted, then raised or lowered and tilted again in order to achieve the proper location.

Figure 2:
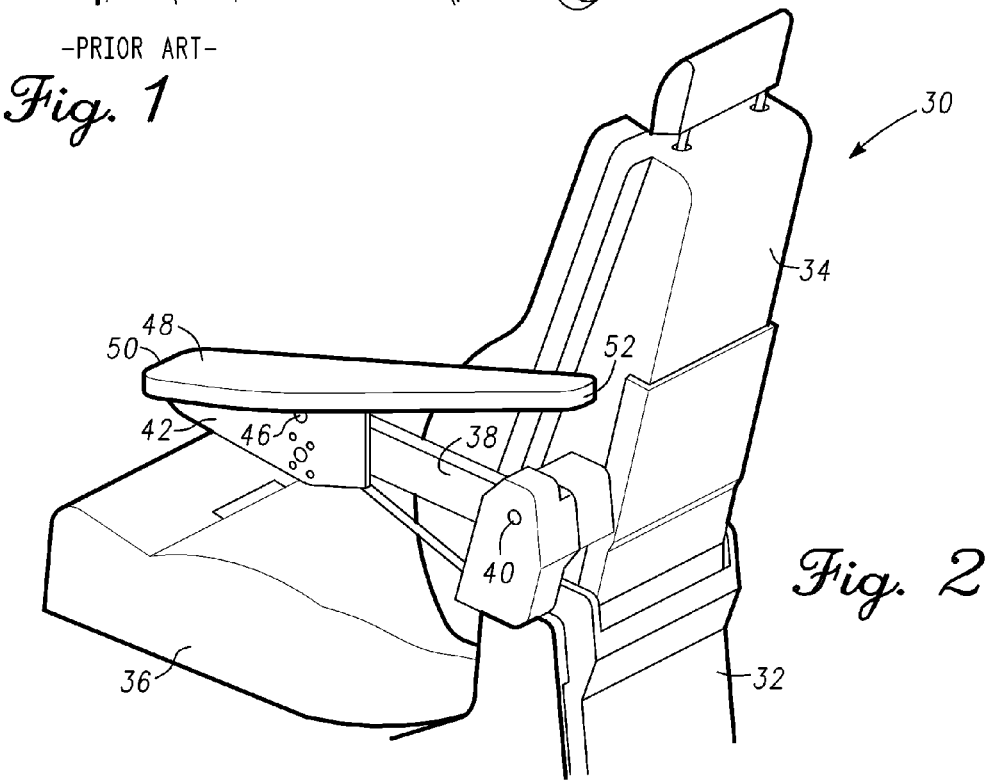
FIG. 2 is a rear perspective view of an aircraft seat with adjustable armrest in accordance with features of the present invention.

With reference to FIGS. 2-8 and in particular FIGS. 2-4, an aircraft seat 30 having an adjustable armrest 28 incorporating features of the present invention comprises a seat frame 32 having a seat back portion 34 and a seat pan portion 36. An arm support member 38 is attached by means of a hinge 40 to seat frame 32 proximal seat back 34. An arm platform member 42 is attached by means of a hinge 46 to the free end 44 of arm support member 38. An armrest pad 48 is secured (e.g., with screws) to arm platform member 42. Armrest pad 48 extends from wrist-end 50, which is proximal the side stick controller of the aircraft (not shown) to elbow end 52, which is proximal seat back portion 34. Arm support member 38 and arm platform member 42 are preferable made of a lightweight aluminum or titanium alloy but may be constructed of any suitably rigid lightweight material including composites.

Figure 7:
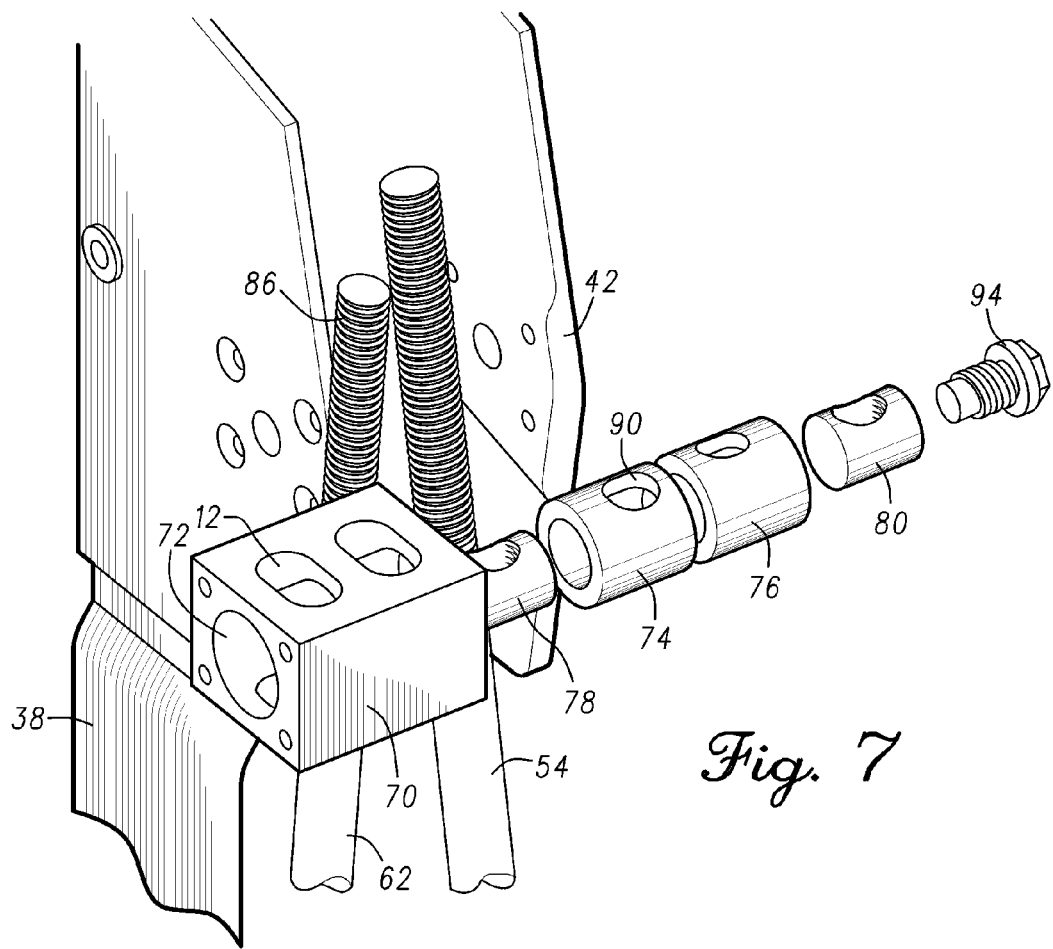
FIG. 7 is an exploded view of the locking mechanism of FIG. 5.

With particular reference to FIGS. 3, 4 and 7, vertical adjustment of arm platform member 42 is achieved by rotating arm support member 38 about hinge 40, thus raising or lowering arm platform member 42. Arm support member 38 can be selectively locked into position by means of a telescoping strut 54 which is attached by a hinge 56 to seat frame 32. The free end 58 of telescoping strut 54 telescopes through a locking mechanism 60 described more fully hereinafter. Telescoping strut 54, arm support member 38, arm platform member 42 and seat frame 32 form a quadrilateral linkage, and in particular a trapezoidal linkage which, due to the unequal lengths of the linkage arms, forms a rigid truss when telescoping strut 54 is prevented from telescoping through locking mechanism 60. For example, in the illustrative embodiment, the effective length of arm support member 38 is 7½ to 11½ inches, preferably about 9½ inches, the effective length of arm platform member 42 is 1 to 3 inches, preferably about 2 inches, the effective length of seat frame 32 is 2 to 6 inches, preferably about 4 inches (but is not the same length as the effective length of arm platform member 42 so as to ensure the linkage cannot form a parallelogram) and the effective length of telescoping strut 54 varies from about 7½ to about 13½ inches, and preferably varies from about 9½ to 11½ inches depending on the relative positions of arm support member 38 and arm platform member 42. As used herein "effective length" means the distance between the attachment points of the frame member in question. For example the effective length of arm support member 38 is the distance from hinge 40 to hinge 46, the effective length of seat frame 32 is the distance from hinge 40 to hinge 56, and the effective length of telescoping strut 54 is the distance from hinge 56 to locking mechanism 60.

The tilting of arm platform member 42 is achieved by rotating arm platform member 42 about hinge 46. Arm platform member 42 can be selectively locked in place about hinge 46 by means of a second telescoping strut 62 which is attached to arm support member 38 by means of a hinge 64. The free end 66 of telescoping strut 62 telescopes through locking mechanism 60 in a manner more fully described hereinafter. Telescoping strut 62, arm support member 38 and arm platform member 42 form a triangular linkage which becomes a triangular truss that prevents arm platform member from rotating when telescoping strut 62 is prevented from telescoping through locking mechanism 60. For example, in the illustrative embodiment, the effective length of arm support member 38 is 7½ to 11½ inches, preferably about 9½ inches, the effective length of arm platform member 42 is 1 to 3 inches preferably about 2 inches, and the effective length of telescoping strut 62 varies from 4 to 9 inches and preferably varies from about 6 to 7¼ inches.

Figure 8:
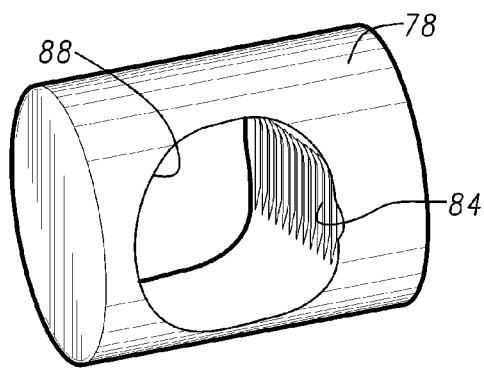
FIG. 8 is a perspective view of a barrel nut used in the locking mechanism of FIG. 5.

In the illustrative embodiment, locking mechanism 60 comprises a pillow block 70 that is secured (e.g., by threaded fasteners) to arm platform member 42. Pillow block 70 includes a longitudinal cylindrical bore 72 adapted to receive a pair of pilot sleeves 74, 76 and two transverse bores 92. Each of the pilot sleeves 74, 76 has a cylindrical bore adapted to receive a barrel nut 78, 80. As shown in FIG. 8, barrel nut 78 is cross-drilled and threaded with threads 84 matched to threads 86 formed at the end of telescoping strut 62. A smooth-walled relief 88 is then formed in barrel nut 78 which enables barrel nut 78 to slide smoothly over threads 86 of telescoping strut 62 as long as barrel nut 78 is biased so relief 88 rather than threads 84 engage the threads 86 of telescoping strut 62.

The locking mechanism for telescoping strut 62 is assembled by inserting pilot sleeve 74 into pillow block 70 then inserting barrel nut 78 into pilot sleeve 74 so that relief 88 is lined up with aperture 90 formed in pilot sleeve 74. Telescoping strut 62 is then passed through the corresponding transverse bores 92 formed in pillow block 70, aperture 90 formed in pilot sleeve 74 and barrel nut 78. Aperture 90 in pilot sleeve 74 is sized to approximately the major diameter of threads 86 of telescoping strut 62 so that telescoping strut 62 can slide smoothly through pilot sleeve 74. Transverse bore 92 in pillow block 70 is elongated to accommodate the change in angular relationship between telescoping strut 62 and pillow block 70 as armrest 28 is raised, lowered and tilted as described herein.

Once assembled, locking mechanism 60 can be moved from an unlocked position into a locked position. In the unlocked position, the smooth wall of relief 88 of barrel nut 78 bears against threads 86 of telescoping strut 62 which permits telescoping strut 62 to move smoothly through pillow block 70. In the locked position, barrel nut 78 is pressed against telescoping strut 62 so that threads 84 of barrel nut 78 engage threads 86 of telescoping strut 62, which is then pinched between barrel nut 78 and pilot sleeve 74 thus locking telescoping strut 62 firmly into position. The operation of barrel nut 80 and pilot sleeve 76 with respect to telescoping strut 54 is identical and therefore will not be explained in detail. Springs (not shown) co-axial with telescoping struts 54 and 62 that bear against pillow block 70 may be incorporated to bias the armrest 28 upward and tilted back so that armrest 28 "floats" when locking mechanism 60 is released, thus enabling armrest 28 to be adjusted in a single operation by pushing armrest 28 into the desired position and engaging locking mechanism 60. In the illustrative embodiment, the use of standard thread forms to fabricate threads 84 of barrel nut 78 and threads 86 of telescoping strut 62, enables production of a very robust locking mechanism, while permitting very precise adjustments at relatively low cost as compared with conventional prior art ratchet and screw drive mechanisms.

In the illustrative embodiment, barrel nuts 78 and 80 are urged into their locked position by means of a threaded a locking plunger 94. A spring, rubber pad or other resilient means may optionally be included to urge the barrel nuts into their released positions when locking plunger 94 is withdrawn.

Although certain illustrative embodiments and methods have been disclosed herein, it will be apparent from the foregoing disclosure to those skilled in the art that variations and modifications of such embodiments and methods may be made without departing from the invention. For example, although in the illustrative embodiment, the telescoping struts telescope by passing through a locking mechanism located at the wrist end of the arm support member, the telescoping struts could pass through locks located at the seat back end of the arm support member or could comprise true telescoping struts that lock at a location intermediate the ends of the struts. Additionally, although the illustrative embodiment employs standard thread forms, nonstandard thread forms and/or non-helical teeth could be substituted without departing from the scope of the invention. Accordingly, it is intended that the invention should be limited only to the extent required by the appended claims and the rules and principles of applicable law. Additionally, as used herein, unless otherwise specifically defined, the terms "substantially," "about," or "generally" when used with mathematical concepts or measurements mean within ±10 degrees of angle or within 10 percent of the measurement, whichever is greater.

What is claimed is:

1. A seat comprising:
   a seat frame having a seat back portion and a seat pan portion,
   an arm support member, said arm support member having a hinged end and a free end, the hinged end of said arm support member being pivotably mounted to said seat frame;
   an arm platform member, said arm platform member having a hinged end and a free end, the hinged end of said arm platform member being pivotably mounted to the free end of said arm support member;
   a first telescoping strut, said first telescoping strut having a hinged end and a free end, the hinged end of said first telescoping strut being pivotably mounted to said seat frame, the free end of said first telescoping strut slidably engaging said arm platform member proximal the free end of said arm support member, said frame, said first telescoping strut, said arm platform member and said arm support member forming a quadrilateral linkage;

a second telescoping strut, said second telescoping strut having a hinged end and a free end, the hinged end of said second telescoping strut being pivotably mounted to said arm support member, the free end of said second telescoping strut slidably engaging the arm platform member proximal the free end of said arm support member said second telescoping strut, said arm platform member and said arm support member forming a triangular linkage; and a locking mechanism for selectively engaging said first and second telescoping struts to prevent sliding engagement between said first and second telescoping struts and said arm platform member.

2. The seat of claim 1, wherein:
the hinged end of said arm support member is proximal the seat back portion such that said arm support member extends away from the seat back; and
said arm platform member extends from the free end of said arm support member toward the seat back portion.

3. The seat of claim 1, wherein:
the quadrilateral linkage has no linkages having lines of action that remain parallel throughout the range of motion.

4. The seat of claim 1, wherein:
the hinged end of said first telescoping strut is pivotably mounted to said frame proximal the hinged end of said arm support member.

5. The seat of claim 4, wherein:
the hinged end of said first telescoping strut is pivotably mounted to said frame within 2 to 6 inches of the hinged end of said arm support member.

6. The seat of claim 1, wherein:
the hinged end of said arm support member is attached to said frame proximal the seat back portion.

7. The seat of claim 1, wherein:
said locking mechanism located at the free end of arm support.

8. The seat of claim 1, wherein,
the hinged end of said arm support member and the hinged end of said arm platform member pivot about substantially parallel, horizontal axes.

9. The seat of claim 1, wherein,
the free end of said first telescoping strut comprises a threaded rod member; and wherein said locking mechanism comprises a barrel nut operatively attached to said arm platform member, said barrel nut having an oblong hole formed therein, the oblong hole having a plurality of helical threads formed along a portion of an interior wall thereof, said barrel nut moveable from a first position in which said helical threads engage said threaded rod member to prevent relative motion between said threaded rod member and said barrel nut to a second position in which the plurality of helical threads disengage said threaded rod member to permit said threaded rod member to slide through said barrel nut.

10. The seat of claim 9, wherein,
said barrel nut further comprises a smooth surface formed along a portion of the interior wall opposite the plurality of helical threads, wherein the smooth side of the interior wall contacts said threaded rod member when said barrel nut is in the second position.

11. The seat of claim 9, wherein:
said barrel nut is pivotably mounted in a bushing to rotate about an axis normal to the oblong hole.

12. A seat comprising:
a seat frame having a seat back portion and a seat pan portion,
an arm support member, said arm support member having a hinged end and a free end, the hinged end of said arm support member being pivotably mounted to said seat frame;
an arm platform member, said arm platform member having a hinged end and a free end, the hinged end of said arm platform member being pivotably mounted to the free end of said arm support member;
a first telescoping strut, said first telescoping strut operatively attached between said seat frame and the free end of said arm platform member so that said frame, said first telescoping strut, said arm platform member and said arm support member form a quadrilateral linkage;
a second telescoping strut operatively attached between said arm support member and the free end of said arm platform member so that said second telescoping strut, said arm support member and said arm platform member form a triangular linkage;
a locking mechanism moveable between a first position in which said first and second telescoping struts are free to telescope thereby allowing said arm support member and said arm platform member to pivot about their fixed ends, and a second position in which said first and second telescoping struts are locked in a rigid configuration, thereby preventing said arm support member and said arm platform member from pivoting about their fixed ends.

13. The seat of claim 12, wherein:
said first and second telescoping struts each telescope relative to said arm platform member by slidably engaging one of a plurality of pilot sleeves mounted to said arm platform member to form a sliding engagement.

14. The seat of claim 13, wherein:
the sliding engagement comprises a threaded rod member formed at a free end of each of said first and second telescoping struts, wherein said locking mechanism comprises first and second-a barrel nuts operatively attached to said arm platform member, said first and second barrel nuts each having an oblong hole formed therein, the oblong hole having a plurality of helical threads formed along a portion of an interior wall thereof, said first and second barrel nuts being moveable from a first locked position in which said helical threads engage said threaded rod members to prevent relative motion between said threaded rod member and said first and second barrel nuts to a second unlocked position in which the plurality of helical threads disengage said threaded rod members to permit said threaded rod members to slide through said first and second barrel nuts.

15. The seat of claim 14, further comprising:
a locking plunger for moving said first and second barrel nuts in unison from their respective locked to unlocked positions.

16. The seat of claim 14, wherein:
said first and second barrel nuts are mounted to said plurality of pilot sleeves.

17. The seat of claim 12, wherein:
said frame, said first telescoping strut, said arm platform member and said arm support member each comprise a link of said quadrilateral linkage, each of said links having a longitudinal axis defined by a point of attachment at each end therefore, wherein no longitudinal axes remain parallel.

18. A latch mechanism comprising:

first and second sliding linkages, each of said first and second sliding linkages having a free end, the free ends of said first and second sliding linkages each comprising a threaded rod member;

first and second barrel nuts, each of said first and second barrel nuts having a hole formed therein having a longitudinal axis and an oblong cross section, the hole further comprising a plurality of helical threads formed along a portion of an interior wall, said first and second barrel nuts being moveable along an axis transverse to the longitudinal axis of the hole from a first locked position in which the helical threads simultaneously engage the threaded rod members of said first and second sliding linkages to a second unlocked position in which the plurality of helical threads disengage the threaded the threaded rod members of said first and second sliding linkages to permit said threaded rod members to slide through said first and second barrel nuts.

19. The latch mechanism of claim 18, wherein:

said first and second barrel nuts are pivotably mounted for pivoting independently about the transverse axis.

20. The latch mechanism of claim 19, further comprising:

a locking plunger for simultaneously moving said first and second barrel nuts from said locked position to said unlocked position.

* * * * *